US010507745B2

(12) United States Patent
Dry et al.

(10) Patent No.: US 10,507,745 B2
(45) Date of Patent: *Dec. 17, 2019

(54) SEATING ASSEMBLY WITH THERMOELECTRIC DEVICES

(71) Applicant: Ford Global Technologies, LLC, Dearborn, MI (US)

(72) Inventors: Alan George Dry, Grosse Point Woods, MI (US); Marcos Silva Kondrad, Macomb Township, MI (US); Kevin Wayne Preuss, Berkley, MI (US); Spencer Robert Hoernke, Dundas (CA); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

This patent is subject to a terminal disclaimer.

(21) Appl. No.: 15/689,323

(22) Filed: Aug. 29, 2017

(65) Prior Publication Data

US 2019/0061573 A1    Feb. 28, 2019

(51) Int. Cl.
*B60N 2/56* (2006.01)

(52) U.S. Cl.
CPC ........... *B60N 2/5635* (2013.01); *B60N 2/565* (2013.01); *B60N 2/5642* (2013.01); *B60N 2/5657* (2013.01); *B60N 2/5678* (2013.01)

(58) Field of Classification Search
CPC .... B60N 2/5621; B60N 2/5635; B60N 2/565; B60N 2/5657; B60N 2/5678
See application file for complete search history.

(56) References Cited

U.S. PATENT DOCUMENTS

| 3,030,145 A | 4/1962 | Cottemann |
| 3,165,620 A | 1/1965 | Miller |
| 5,597,200 A | 1/1997 | Gregory et al. |
| 5,626,021 A | 5/1997 | Karunasiri et al. |
| 5,921,858 A | 7/1999 | Kawai et al. |

(Continued)

FOREIGN PATENT DOCUMENTS

| CN | 201890168 U | 7/2011 |
| CN | 203651539 U | 6/2014 |

(Continued)

OTHER PUBLICATIONS

Elarusi, Abdulmunaem H., "Optimal Design of a Thermoelectric Cooling/Heating System for Car Seat Climate Control (CSCC)" 2016. Master's Theses. 720, Western Michigan University, ScholarWorks at WMU.

(Continued)

*Primary Examiner* — Philip F Gabler
(74) *Attorney, Agent, or Firm* — Vichit Chea; Price Heneveld LLP

(57) ABSTRACT

A vehicle seating assembly includes a seating surface and a tube arranged proximate the seating surface. The tube has an inlet fluidly coupled with a fluid mover and an outlet proximate the seating surface. A thermoelectric device is in communication with the outlet. The thermoelectric device is configured to thermodynamically affect heat exchange at the seating surface. The fluid mover is selectively operable to release a pressurized fluid through the tube proximate the thermoelectric device.

20 Claims, 14 Drawing Sheets

(56) References Cited

U.S. PATENT DOCUMENTS

| | | | |
|---|---|---|---|
| 5,927,817 A | 7/1999 | Ekman et al. | |
| 6,048,024 A | 4/2000 | Wallman | |
| 6,079,485 A | 6/2000 | Esaki et al. | |
| 6,119,463 A | 9/2000 | Bell | |
| 6,291,803 B1 | 9/2001 | Fourrey | |
| 6,478,369 B1 | 11/2002 | Aoki et al. | |
| 6,541,737 B1 | 4/2003 | Eksin et al. | |
| 6,606,866 B2 * | 8/2003 | Bell | B60H 1/00471 62/3.3 |
| 7,178,344 B2 | 2/2007 | Bell | |
| 7,320,357 B2 | 1/2008 | Pause | |
| 7,475,464 B2 | 1/2009 | Lofy et al. | |
| 7,640,754 B2 | 1/2010 | Wolas | |
| 7,828,050 B2 * | 11/2010 | Esaki | B60H 1/00285 165/202 |
| 8,359,871 B2 | 1/2013 | Woods et al. | |
| 8,702,164 B2 | 4/2014 | Lazanja et al. | |
| 8,998,311 B2 | 4/2015 | Axakov et al. | |
| 9,105,808 B2 | 8/2015 | Petrovski | |
| 9,105,809 B2 | 8/2015 | Lofy | |
| 9,272,647 B2 | 3/2016 | Gawade et al. | |
| 9,310,112 B2 | 4/2016 | Bell et al. | |
| 9,335,073 B2 | 5/2016 | Lofy | |
| 9,366,461 B2 | 6/2016 | Bell et al. | |
| 9,403,460 B2 | 8/2016 | Hickey et al. | |
| 9,440,567 B2 | 9/2016 | Lazanja et al. | |
| 9,468,045 B2 | 10/2016 | Zhang et al. | |
| 9,676,310 B2 | 6/2017 | Fitzpatrick et al. | |
| 10,252,652 B2 * | 4/2019 | Dry | B60N 2/5635 |
| 2006/0087160 A1 | 4/2006 | Dong et al. | |
| 2006/0138812 A1 | 6/2006 | Aoki | |
| 2006/0175877 A1 | 8/2006 | Alionte et al. | |
| 2006/0208540 A1 | 9/2006 | Lofy et al. | |
| 2007/0188007 A1 | 8/2007 | Lazanja et al. | |
| 2010/0066133 A1 | 3/2010 | Benton | |
| 2010/0209230 A1 | 8/2010 | Eckel | |
| 2010/0327637 A1 | 12/2010 | Bajic et al. | |
| 2013/0097777 A1 | 4/2013 | Marquette et al. | |
| 2015/0069798 A1 | 3/2015 | Bajic | |
| 2015/0266405 A1 | 9/2015 | Fitzpatrick et al. | |
| 2015/0274049 A1 | 10/2015 | Langensiepen et al. | |
| 2015/0329027 A1 | 11/2015 | Axakov | |
| 2016/0009206 A1 | 1/2016 | Perraut et al. | |
| 2016/0137110 A1 | 5/2016 | Lofy et al. | |
| 2016/0332549 A1 * | 11/2016 | Marquette | B60N 2/5657 |
| 2017/0240078 A1 | 8/2017 | Ishii et al. | |
| 2018/0020838 A1 | 1/2018 | Ishii et al. | |
| 2019/0061464 A1 * | 2/2019 | Dry | B60H 1/00285 |

FOREIGN PATENT DOCUMENTS

| | | |
|---|---|---|
| DE | 102013021199 A1 | 7/2014 |
| EP | 1723876 A1 | 11/2006 |

OTHER PUBLICATIONS

Lee, Dr. Hosung, "Optimal Design of a Thermoelectric Cooling/Heating for a Car Seat Comfort" 2014.

* cited by examiner

… (1) …

SEATING ASSEMBLY WITH THERMOELECTRIC DEVICES

FIELD OF THE DISCLOSURE

The present disclosure generally relates to a vehicle seating assembly, and more particularly to a climate controlled vehicle seating assembly.

BACKGROUND OF THE DISCLOSURE

Vehicle seat comfort has become increasingly important as passengers take longer trips. Providing cooling and heating in the seat can increase comfort of passengers.

A variety of vehicle seating assemblies that provide for occupant cooling and heating are known. However, current solutions for providing cooled and heated surfaces can take extended periods of time to reach an occupant-perceptible temperature.

SUMMARY OF THE DISCLOSURE

According to one aspect of the present disclosure, a vehicle seating assembly includes a seating surface, and a tube arranged proximate the seating surface. The tube has an inlet fluidly coupled with a fluid mover and an outlet proximate the seating surface. A thermoelectric device is in communication with the outlet and configured to thermodynamically affect heat exchange at the seating surface. The fluid mover is selectively operable to release a pressurized fluid through the tube proximate the thermoelectric device.

Aspects of the first aspect of the disclosure can include any one or a combination of the following features:
- a temperature reduction at the outlet due to an adiabatic process or a Joule-Thomson effect;
- the thermoelectric device comprises an upper surface and lower surface wherein the pressurized fluid travels along the lower surface of the thermoelectric device and away from the seating surface;
- a temperature of the upper surface of the thermoelectric device is less than a temperature of the lower surface of the thermoelectric device so that the pressurized fluid carries heat away from the lower surface of the thermoelectric device;
- a temperature of the upper surface of the thermoelectric device is greater than a temperature of the lower surface of the thermoelectric device so that the pressurized fluid is chilled by the lower surface of the thermoelectric device;
- a conductive pad wherein the conductive pad is between the thermoelectric device and the seating surface;
- the tube is one of a plurality of tubes and wherein the thermoelectric device is one of a plurality of thermoelectric devices;
- a holder proximate the seating surface, wherein the holder retains the thermoelectric device, wherein the outlet of the tube is fluidly coupled to the holder below the thermoelectric device, and wherein the pressurized fluid travels from the outlet into the holder, along the thermoelectric device and out of the holder away from the seating surface;
- the holder is puck shaped;
- the holder is an insulator;
- a carrier layer retains the tube, the holder, and the thermoelectric device;
- the seating surface extends over a seat and wherein the inlet is at a downward facing portion of the seat and the outlet is at an upward facing portion of the seat; and/or
- the seating surface extends over a seatback and wherein the inlet is at a rearward facing portion of the seatback and the outlet is at a forward facing portion of the seatback.

According to another aspect of the present disclosure, a seating assembly includes a seating surface extending over at least one of a seat and a seatback. The seating assembly also includes a fluid mover and a seat trim proximate the seating surface. A fluid transfer member integral to the seat trim includes a gallery wherein the gallery has an inlet and an outlet and wherein the inlet is coupled to the fluid mover and the outlet is proximate a thermoelectric device. The thermoelectric device is arranged proximate the seating surface to heat or cool an occupant. The fluid mover is selectively operable to direct fluid away from the seating surface to increase an efficiency of the thermoelectric device.

Aspects of the second aspect of the disclosure can include any one or a combination of the following features:
- the fluid transfer member is an extruded polypropylene part.

According to another aspect of the present disclosure, a seating assembly includes a seating surface, a retainer including an inlet port, an outlet port, and an outlet aperture. The thermoelectric device is supported by the retainer proximate the seating surface. The seating assembly also includes a fluid mover and a hose comprising an inlet and an outlet. The hose inlet is fluidly coupled to the fluid mover. The retainer encircles the hose in a sleeve-like configuration when the hose passes through the inlet port and the outlet port. The hose outlet is within the retainer and proximate the thermoelectric device. The thermoelectric device is selectively activated to heat or cool the seating surface. The fluid mover is selectively activated to deliver pressurized fluid through the hose outlet, proximate the thermoelectric device, and out of the outlet aperture.

Aspects of the third aspect of the disclosure can include any one or a combination of the following features:
- the hose outlet is one of a plurality of outlets along a length of the hose, wherein the retainer is one of a plurality of retainers that encircle the hose, and wherein the plurality of outlets are within the plurality of retainers;
- the seating surface comprises at least one of: a seat surface and a seatback surface;
- the pressurized fluid has a lower temperature at the hose outlet than at the hose inlet because a cooling effect is achieved by an adiabatic process or a Joule-Thomson effect; and/or
- the retainer is rigid.

These and other aspects, objects, and features of the present disclosure will be understood and appreciated by those skilled in the art upon studying the following specification, claims, and appended drawings.

DETAILED DESCRIPTION

Figure 1:
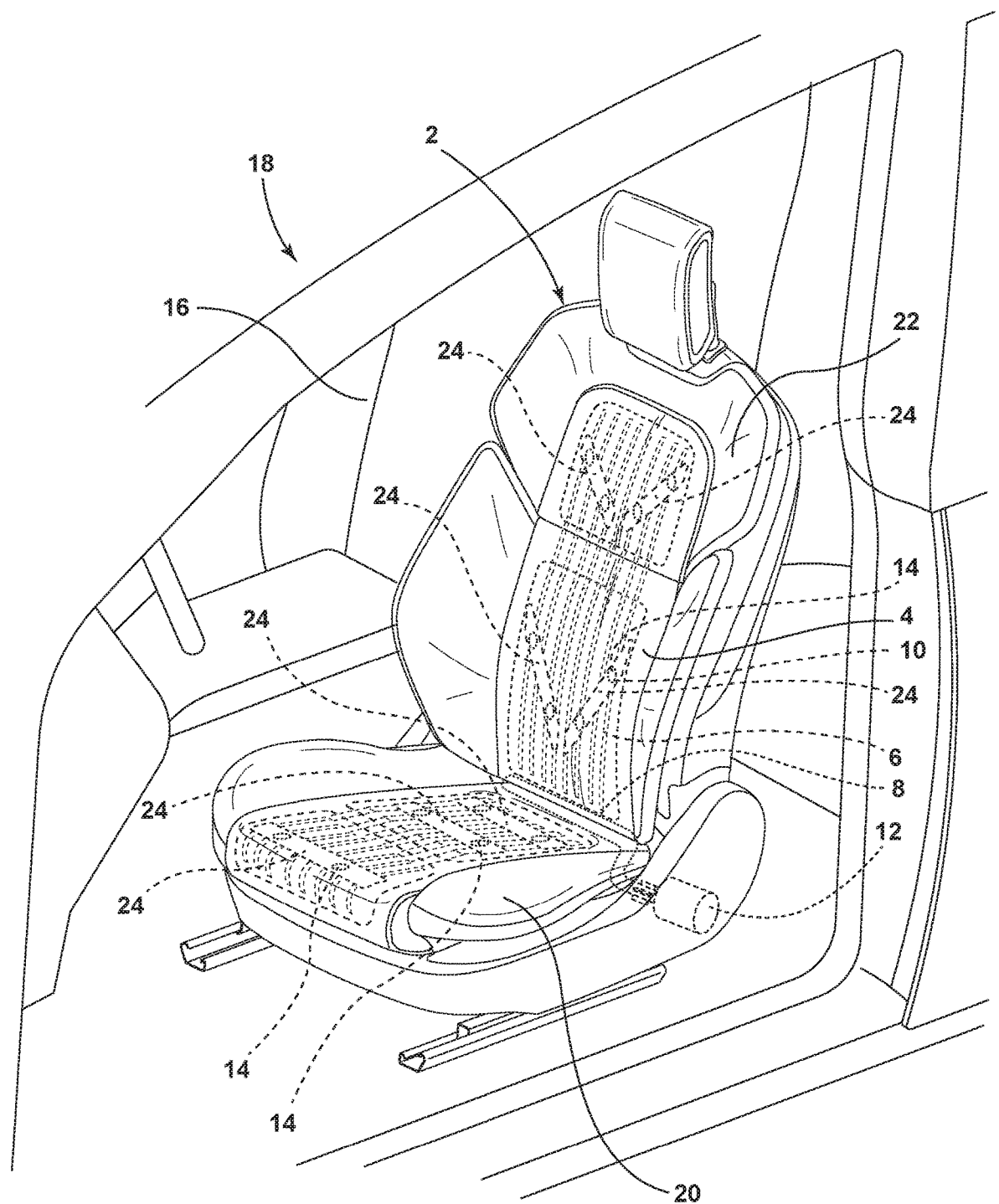
FIG. 1 is a side perspective view of the seating assembly in a vehicle of an aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary aspects of the inventive concepts defined in the appended claims. Hence, specific dimensions and other physical characteristics relating to the aspects disclosed herein are not to be considered as limiting, unless the claims expressly state otherwise.

Referring to FIGS. 1-14, a vehicle seating assembly 2 includes a seating surface 4 and a tube 6 arranged proximate the seating surface 4. The tube 6 has an inlet 8 fluidly coupled with a fluid mover 12 and an outlet 10 proximate the seating surface 4. A thermoelectric device 14 is in communication with the outlet 10 and configured to thermodynamically affect heat exchange at the seating surface 4. The fluid mover 12 is selectively operable to release a pressurized fluid through the tube 6 proximate the thermoelectric device 14.

Referring to FIG. 1, the seating assembly 2 is illustrated inside a cabin 16 of a vehicle 18. The seating assembly 2 may be a seat for a driver, a seat for a passenger, a rear bucket seat, a rear row of seats, or any other vehicle seat. The seating assembly 2 includes a seat 20 and a seatback 22 pivotably attached to the seat 20. Temperature control zones 24 are arranged on the seat 20 and the seatback 22 to provide comfort to the occupant during travel. Thermoelectric devices 14 in the temperature control zones 24 cool or heat the occupant. Pressurized cooling airflows increase the efficiencies of the thermoelectric devices 14.

Figure 2:
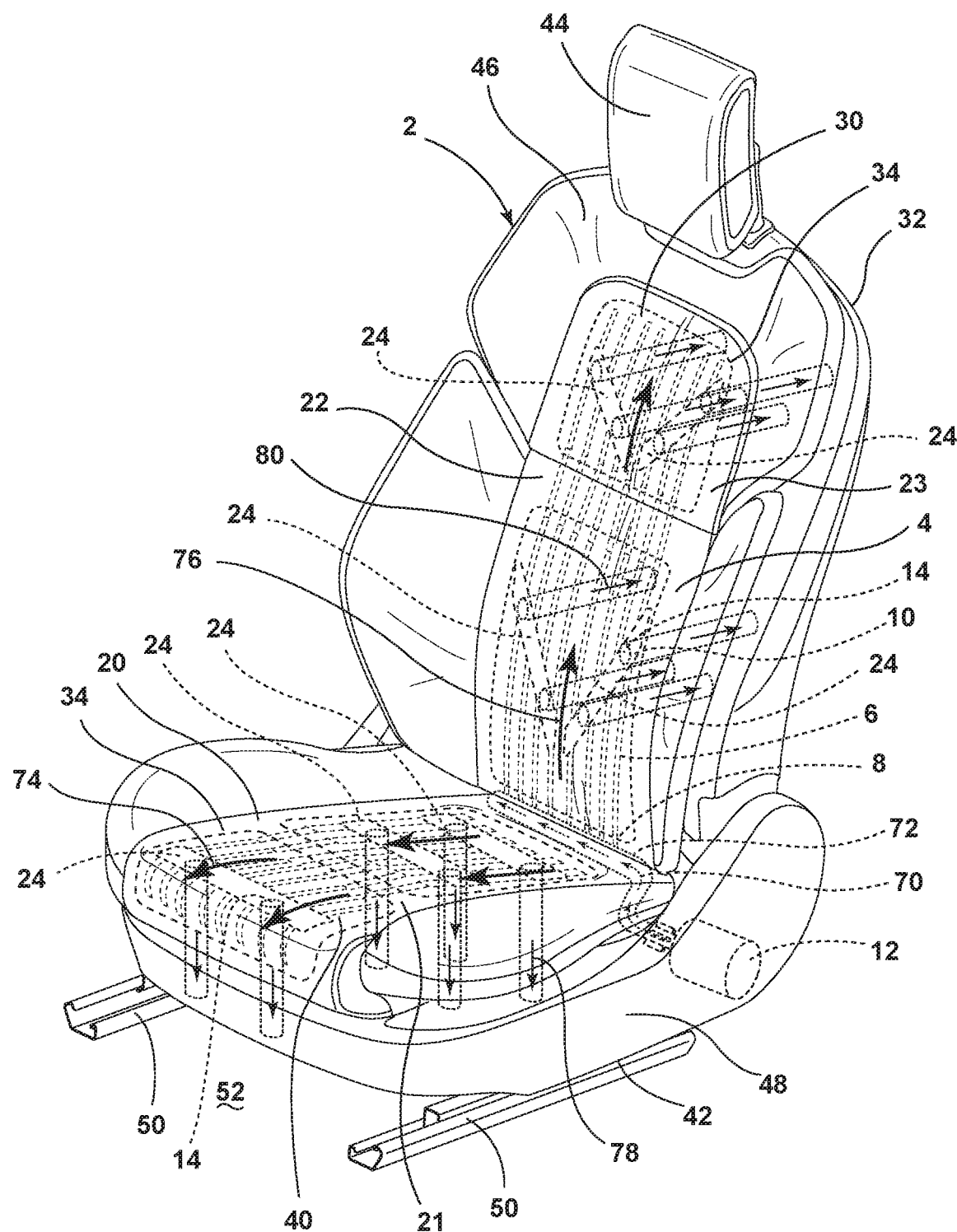
FIG. 2 is a side perspective view of the seating assembly with temperature control zones and a fluid mover of an aspect of the present disclosure.

Referring to FIG. 2, the seating surface 4 of the seating assembly 2 includes a seat surface 21 and a seatback surface 23. The seatback 22 of the seating assembly 2 includes a forward facing portion 30 and a rearward facing portion 32. In various aspects, a trim cover 34 covers the forward facing portion 30. The seat 20 of the seating assembly 2 includes an upward facing portion 40 and a downward facing portion 42. In various aspects, a trim cover 34 covers the upward facing portion 40. The seating assembly 2 also includes a headrest 44 operably coupled to an upper portion 46 of the seatback 22. The seating assembly 2 also typically includes a seat base 48 configured to provide structural support to the seating assembly 2. The seat base 48 is preferably supported on seat mounting rail assemblies 50. The seat mounting rail assemblies 50 are configured to allow the seating assembly 2 to be adjusted in forward and rearward directions relative to the longitudinal axis of the vehicle 18. The seating assembly 2 is slidably coupled with a floor 52. It is also conceivable that the seating assembly 2 may not include the seat mounting rail assemblies 50 and alternatively may be fixedly coupled with the floor 52 of the vehicle 18.

In certain conditions, when temperature and atmospheric conditions are outside of an occupant's comfort range, the seat 20 and the seatback 22 may be uncomfortably warm or cold such that the seating assembly 2 may not provide the occupant with comfortable transit in a vehicle. Thermoelectric devices 14 are utilized in temperature control zones 24 to cool or heat an occupant. Pressurized cool air released proximate the thermoelectric device 14 lower surfaces enhances the cooling or heating effects of the thermoelectric devices at the seating surface 4. Thus, the temperature control zones 24 that provide cooling and heating effects allow the occupant to enjoy a more pleasant traveling experience.

Referring again to FIG. 2, in various aspects, the fluid mover 12 may be a compressor. The pressurized cool air leaves the fluid mover 12 and travels in the directions of arrows 70 through the fluid passageway 72. Pressurized air leaves the fluid passageway 72 and travels into the tubes 6 toward the thermoelectric devices 14 in the directions of arrows 74 on the seat 20 and arrows 76 on the seatback 22. The pressurized air leaves the area proximate the thermoelectric devices 14 in the seat 20 in the directions of arrows 78 and exits at the downward facing portion 42 at the bottom of the seat 20. The pressurized air leaves the area proximate the thermoelectric devices 14 in the seatback 22 in the directions of arrows 80 and exits at the rearward facing portion 32 of the seatback 22.

According to various aspects of the present disclosure, the seating assembly 2 may include various provisions to facilitate the flow of pressurized cooling airflow proximate the thermoelectric devices that cool and heat the seating surface of the seating assembly. For example, in some cases, tubes, galleries, conduits, hoses, holders, and/or retainers may be incorporated in various combinations and various configurations in the seating assembly. For example, in some cases galleries may be part of an extruded panel. In other aspects, conduits may be coupled to holders. In yet other aspects, retainers may be coupled to hoses.

Figure 3:
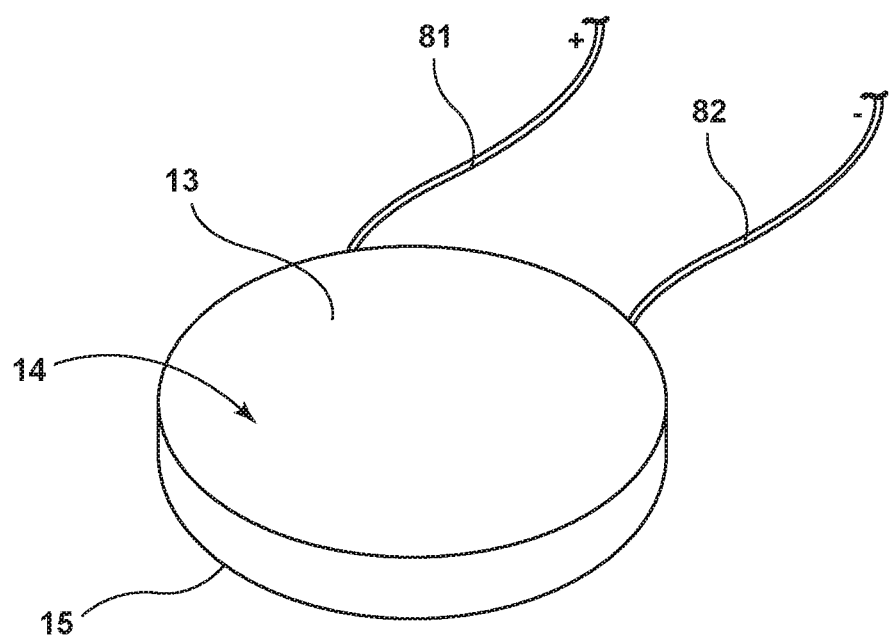
FIG. 3 is a perspective view of a thermoelectric device of FIG. 2.

Referring to FIG. 3, the thermoelectric device 14 of FIG. 2 is shown in a perspective view. The thermoelectric device 14 has an upper surface 13 and a lower surface 15. A positive wire 81 and a negative wire 82 are attached to the thermoelectric device 14. The thermoelectric device 14 is a typical thermoelectric device known to those of skill in the art. The thermoelectric device 14 includes a positive wire 81 and a negative wire 82 that are attached to a power source such as a seat wiring assembly, a vehicle wire harness, or any other power source. The thermoelectric device has an upper surface 13 and a lower surface 15. Each thermoelectric device 14 includes pairs of P-type and N-type semi-conductor thermoelement forming thermocouples which are connected electrically in series and thermally in parallel. A standard module includes transistors connected in series and sandwiched in between two ceramic plates. By applying a current to the module, one ceramic plate is heated while the other is cooled. The direction of the current determines which plate is cooled. The number and size of the transistors as well as the materials used in their manufacturing determine the cooling capacity. The voltage applied to a thermoelectric device 14 determines the temperature of the thermoelectric device upper surface 13 and the temperature of the thermoelectric device lower surface 15. Generally, a current flow that is positive to negative from the upper surface 13 of the thermoelectric device 14 to the lower surface 15 of the thermoelectric device 14 cools the seating surface 4. Conversely, current flow that is negative to positive from the upper surface 13 of the thermoelectric device 14 to the lower surface 15 of the thermoelectric device 14 heats the seating surface 4.

Referring to FIGS. 1-14, in various aspects, an adiabatic process is used to achieve pressurized cooling airflow beneath the thermoelectric device 14 lower surface 15. A fluid mover 12 releases pressurized cooling airflow into tubes 6 proximate the seating surface 4. The pressurized air leaves the tubes 6 at outlets 10 at the lower surfaces 15 of the thermoelectric devices 14. When the thermoelectric device 14 cools an occupant, the pressurized cool air carries heat away from the hot lower surface 15 of the thermoelectric device 14. Alternatively, when the thermoelectric device 14 heats an occupant, the pressurized cool air is chilled by the cold lower surface 15 of the thermoelectric device 14. In thermodynamics, the adiabatic process for ideal gases stands for no transfer of heat or matter out of a system (Q=0). The adiabatic process for an ideal gas is isothermal. However, for air at ambient temperatures, adiabatic compression of a gas causes a rise in the temperature of the gas. Adiabatic expansion against pressure, for example a spring or a metered vent, causes a drop in temperature. In various aspects of the disclosure, the fluid is air or a gas that behaves like air in typical vehicle conditions at ambient temperature. The pressure drop at the point of ambient air release typically causes an adiabatic temperature reduction.

In various aspects of the disclosure, the fluid mover 12 is a compressor that provides pressurized ambient air to the tubes 6 that deliver air to the lower surfaces 15 of the thermoelectric devices 14. The compressor may provide pressurized ambient air with pressure that is approximately 150 times higher than the pressurized ambient air that a typical vehicle seating assembly air mover provides. For example, according to various aspects, a typical pressure of a vehicle seat fan may be approximately 0.066 psig. In various aspects, the pressure that a typical compressor generates may be approximately 10.0 psig, which is approximately 150 times higher than 0.066 psig. The increased air pressure of the compressor has numerous advantages over the air pressure generated by a typical vehicle seating assembly air mover. The increased air pressure of the compressor allows thin and flexible tubes 6 to be used in the seating assembly 2. The increased air pressure of the compressor provides usable residual air pressure at the tube outlet 10 that enables the rapid removal of heated waste air from the seating assembly 2. The pressure drop at the tube outlet 10 of the tube 6 provides a lower temperature that cools the occupant.

Figure 4:
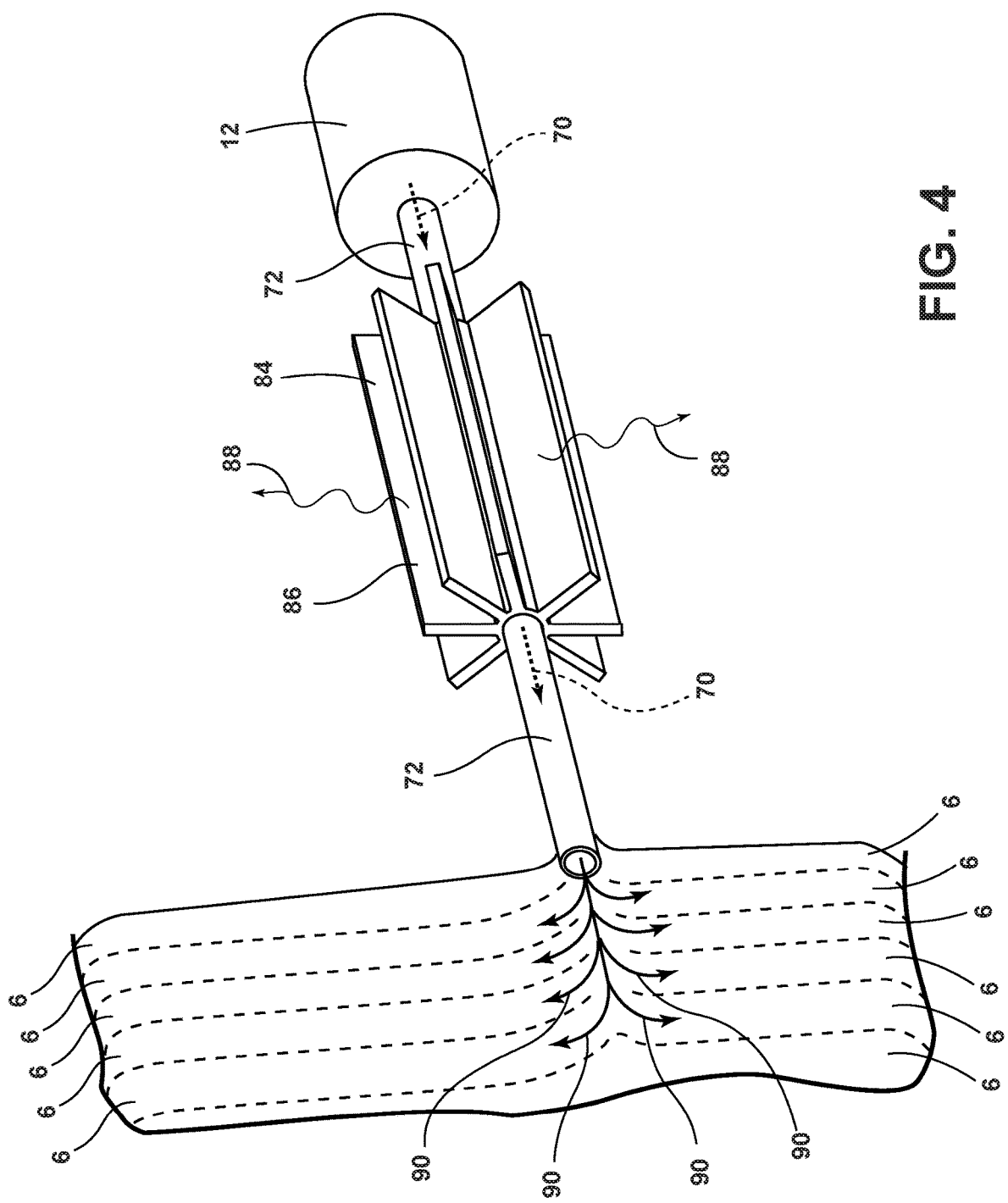
FIG. 4 is a perspective view of a radiator with fluid mover and tubes of an aspect of the present disclosure.

Referring to FIG. 4, in various aspects a radiator 84 or other heat dissipation member (cooler) may be used to dissipate heat from the compressed fluid that may enter the compressed fluid due to work from the fluid mover 12. The fluid mover 12 is coupled to fluid passageway 72. In the depicted aspect, a plurality of fins 86 emanates from the radiator 84. In the depicted aspect, air depicted by arrow 70 leaves the fluid mover 12 and enters the radiator 84. The radiator 84 absorbs heat from the air. Heat leaves the radiator 84 in the direction of arrows 88. Air exits the radiator at arrow 70. The radiator 84 typically increases the efficiency of the adiabatic process by removing heat of compression from the air at arrows 70 before it enters the tubes 6 at arrows 90.

Referring to FIGS. 1-14, the Joule-Thomson Effect may also be used to achieve cooling at the release points of the pressurized air. In thermodynamics, the Joule-Thomson Effect describes the temperature change of a real gas or liquid (as differentiated from an ideal gas) when it is forced through a valve or porous plug while it is kept insulated so that no heat is exchanged with the environment. At room temperature, air cools upon expansion by the Joule-Thomson Effect. The Joule-Thomson Effect may be observed during the throttling process. With reference to FIG. 4, a radiator 84 typically increases the efficiency of the Joule-Thomson Effect by removing heat of compression from the air before it enters the tubes 6.

By way of example, in various aspects, an air supply of approximately kPa absolute pressure (10 psig) is contained in tubes 6. The air supply releases air beneath the thermoelectric devices 14. The temperature drop occurs directly and at the tube outlet 10 as the pressurized air is at ambient temperature. No insulation is required and there is no loss of cooling capacity.

In various aspects, the temperature of the pressurized air leaving tube outlets 10 may be as low as approximately 5.0 degrees Celsius (41 degrees Fahrenheit). In various aspects, the hot surface of the thermoelectric device 14 may be approximately 50 degrees Celsius, and the cold surface of the thermoelectric device 14 may be approximately 35 degrees Celsius.

In various aspects, the tube outlet 10 may be a metered vent. In various aspects, the metered vent may have a diameter of approximately 0.2 mm to approximately 0.6 mm.

Figure 5:
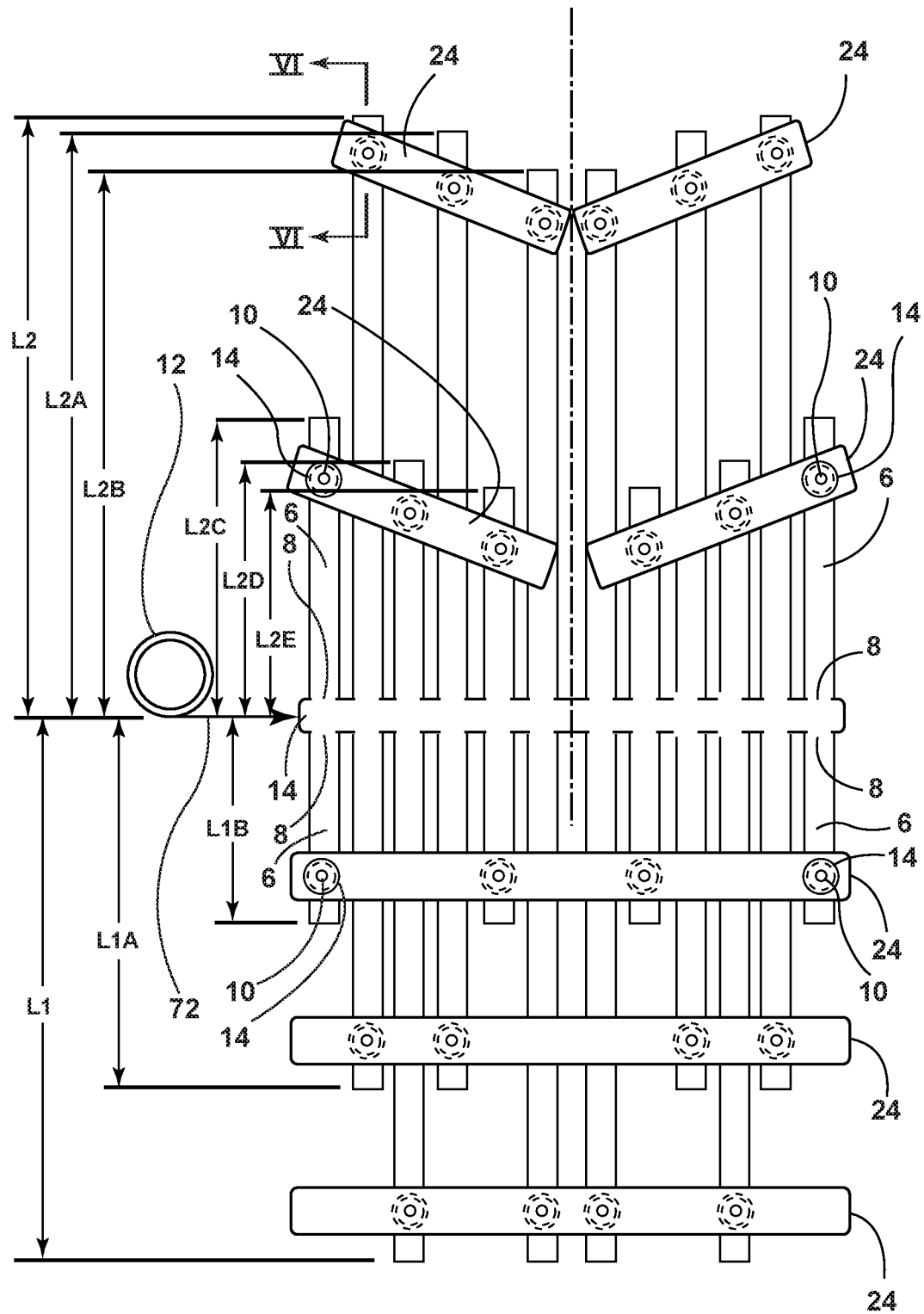
FIG. 5 is a schematic representation of the temperature control zones with a fluid mover of an aspect of the present disclosure.

With regard to FIG. 5, a schematic representation of the general layout of the tubes 6 that deliver air to the lower surfaces 15 of the thermoelectric devices 14 is show. The tubes 6 are in communication with the fluid mover 12. A fluid passageway 72 delivers fluid from the fluid mover 12 to the tube inlets 8. Tube outlets 10 are located proximate the thermoelectric devices 14. The tube lengths ($L_1$, $L_{1A}$, $L_{1B}$, $L_2$, $L_{2A}$, $L_{2B}$, $L_{2C}$, $L_{2D}$, $L_{2E}$, etc.) generally represent approximate distances from the tube inlets 8 to the tube outlets 10. The tube outlets 10 are arranged according to an occupant's physiology at targeted temperature control zones 24. In various aspects, numerous tubes 6 and thermoelectric devices 14 may be present in a configuration similar to that of FIG. 5. In various aspects, a thermoelectric device 14 may have a substantially square shape with each of the sides being approximately 10 mm to approximately 20 mm long. In various aspects, the thermoelectric device 14 may be a circle or other shape.

Figure 6:
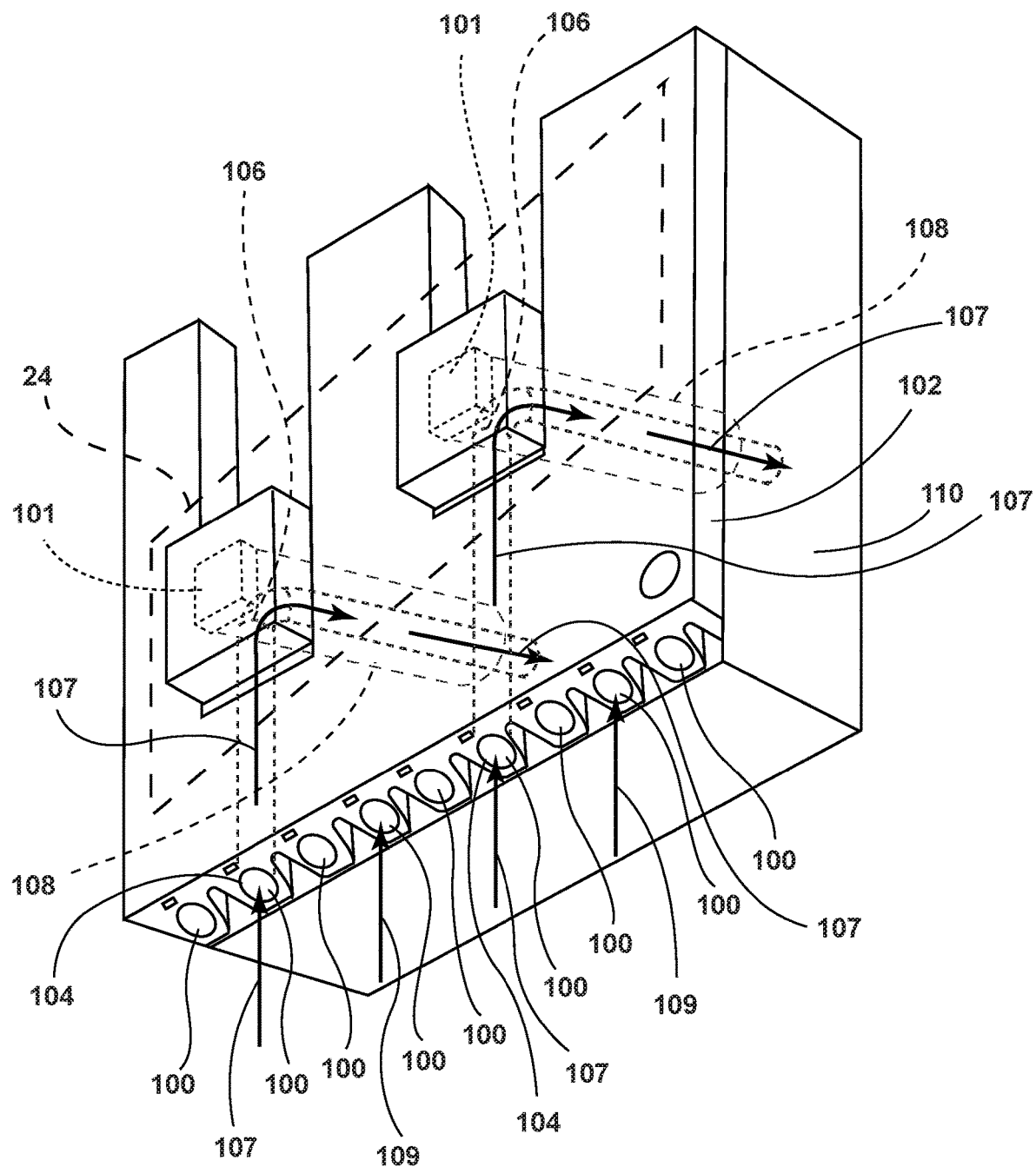
FIG. 6 is a perspective view of a fluid transfer member and base support foam with temperature control zone of an aspect of the disclosure.

Referring to FIG. 6, in various aspects, galleries 100 and thermoelectric devices 101 may be part of a fluid transfer member 102. The galleries 100 have inlets 104 that are in communication with a fluid mover 12. The galleries 100 have outlets 106 located proximate thermoelectric devices 101. In the depicted aspect, the gallery outlets 106 are metered holes. In various aspects, the fluid mover 12 is a compressor and the fluid is air. In various aspects, pressurized air at arrows 107 is routed from the compressor, through the galleries 100 of the fluid transfer member 102, and out of exhaust channel 108 at the lower surfaces of the thermoelectric devices 101. In various aspects, each gallery 100 may have an inlet 104 and one or more outlets 106 at the lower surfaces 15 of one or more thermoelectric devices 14. In the depicted aspect, the fluid transfer member 102 is coupled to a base support foam 110. In various aspects, a plenum interface may be present at the inlets 104 of the fluid transfer member 102. In various aspects, the plenum interface may connect the fluid transfer member 102 to the compressor. In various aspects, the fluid transfer member 102 may be an extruded polypropylene part. Arrows 109 depict air that travels through the fluid transfer member 102 galleries 100 to other thermoelectric devices not shown in FIG. 6. Thermoelectric devices 101 are in a temperature control zone 24.

Figure 7:
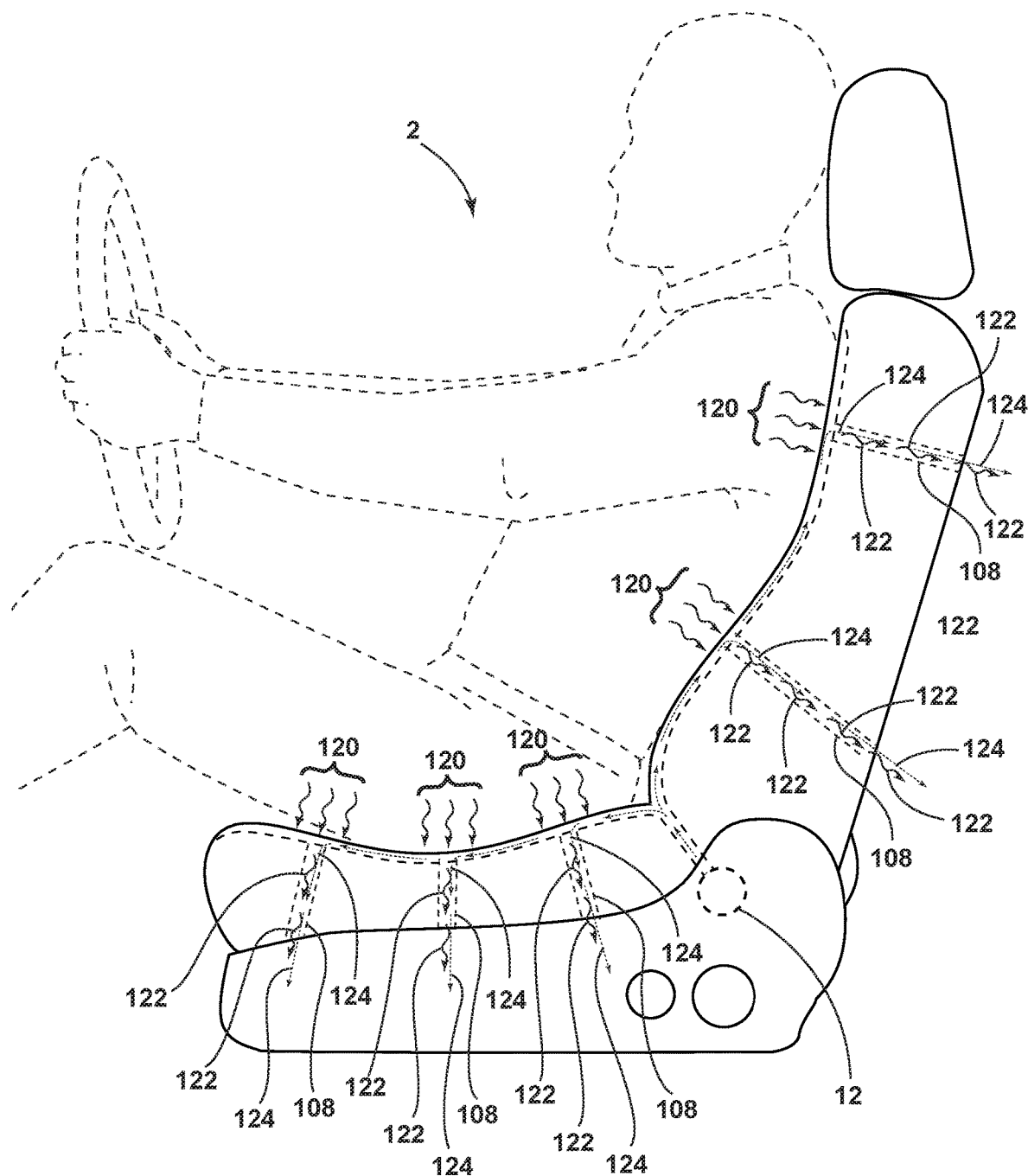
FIG. 7 is a side elevational view of the seating assembly and fluid mover in an occupant cooling mode of an aspect of the present disclosure.
Figure 8:
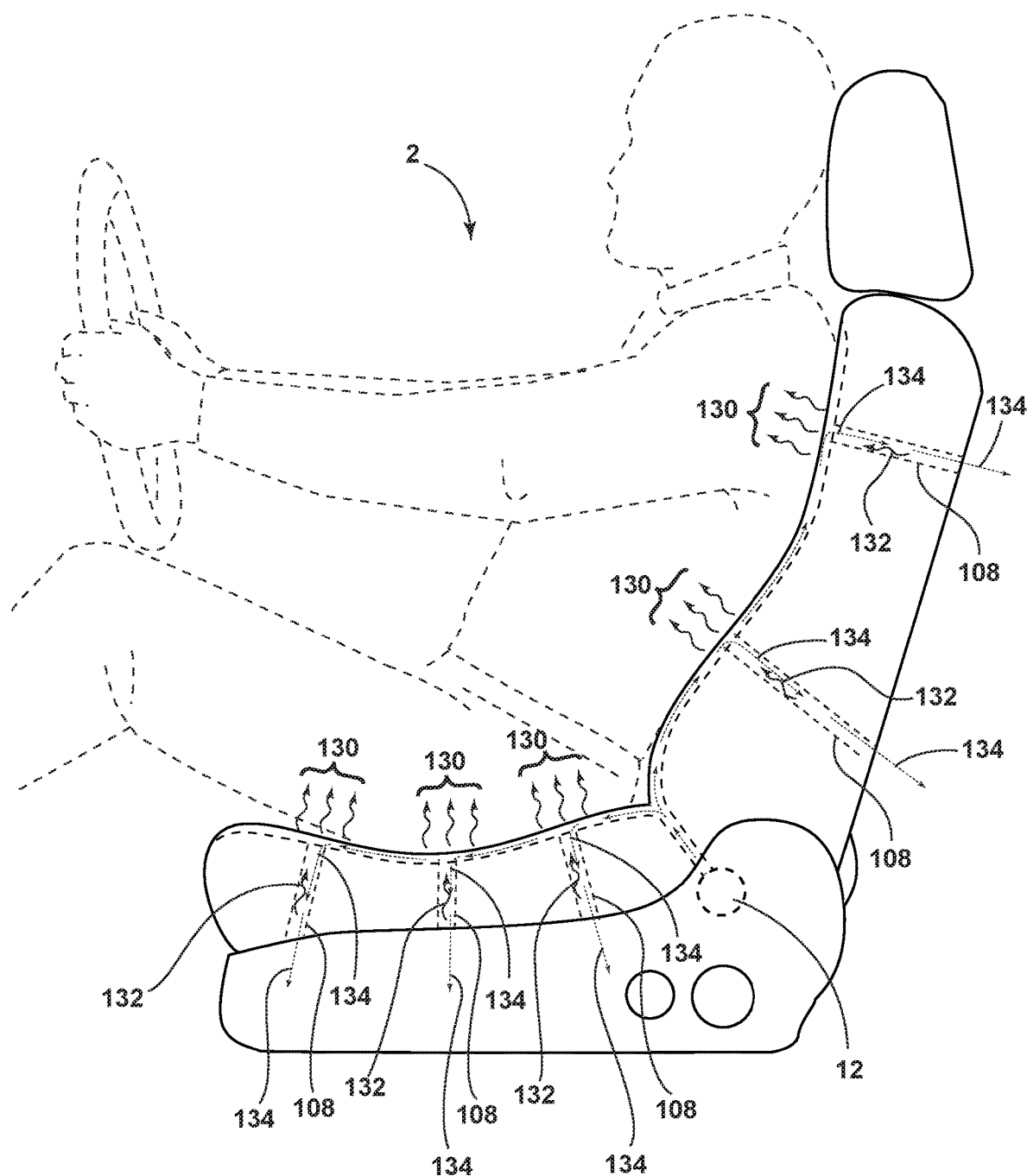
FIG. 8 is a side elevational view of the seating assembly and fluid mover in an occupant heating mode of an aspect of the present disclosure.

With reference to FIGS. 3 and 7, when the upper surface 13 of the thermoelectric device 14 is cold so as to cool the occupant, heat at arrows 120 is drawn from the occupant to the hot lower surface 15 of the thermoelectric device 14. Heat at arrows 122 is drawn from the hot lower surface 15 of the thermoelectric device 14 to the airflow 124 out of the exhaust channels 108. Alternatively, with reference to FIGS. 3 and 8, when the upper surface 13 of the thermoelectric device 14 is hot, heat at arrows 130 is transferred from the hot upper surface 13, of the thermoelectric device 14 to the occupant to heat the occupant. Heat at arrows 132 is transferred from the airflow 134 to the cool lower surface 15 of the thermoelectric device 14. In various aspects, the air beneath the thermoelectric device 14 may be turbulent.

Figure 9:
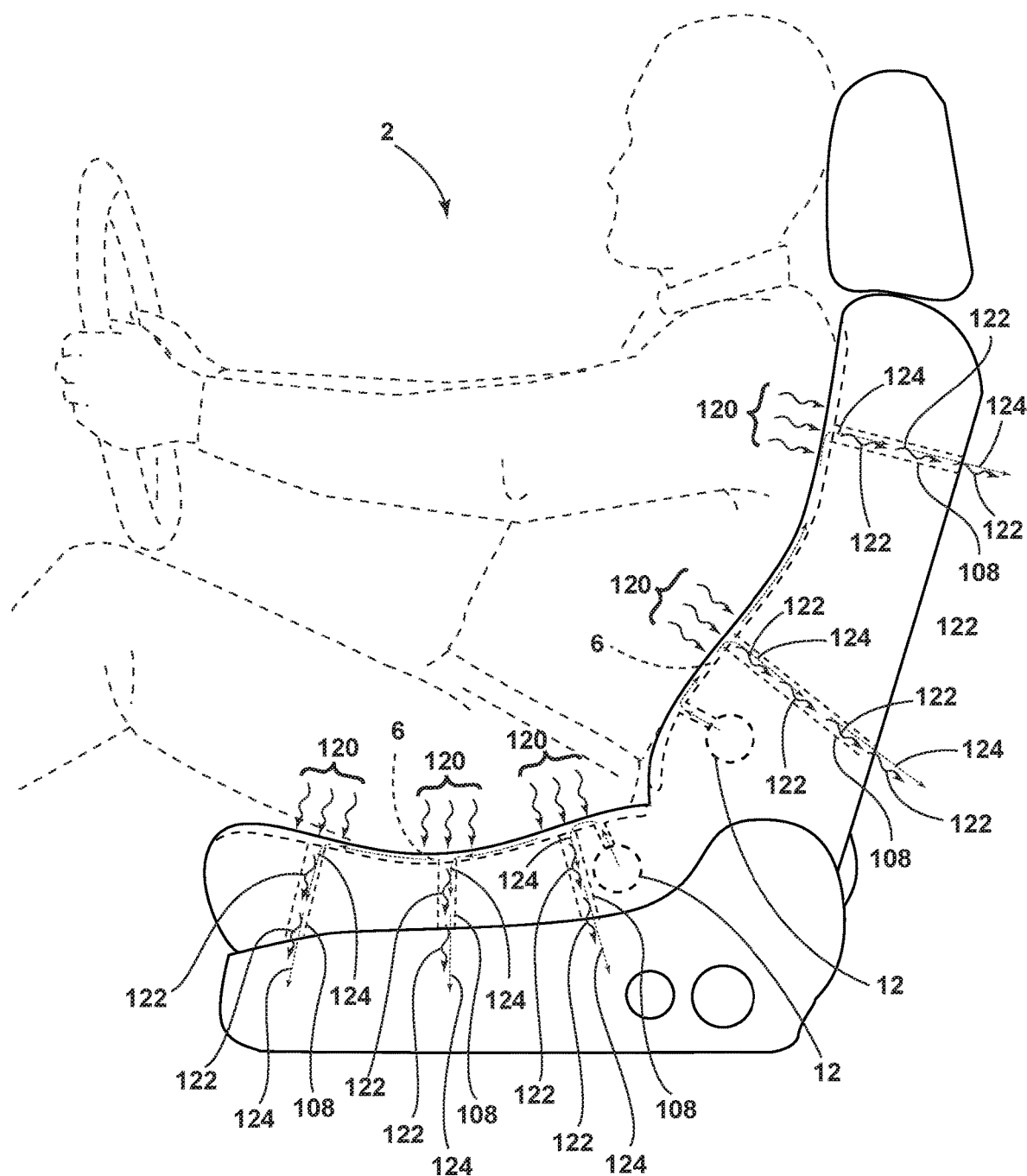
FIG. 9 is a side elevational view of the seating assembly with fluid mover and two compressors of an aspect of the present disclosure.

Referring to FIG. 9, the seating assembly 2 is in an occupant cooling mode with two fluid movers 12. One fluid mover 12 provides fluid to tubes 6 in the seat 20. One fluid mover 12 provides fluid to tubes 6 in the seatback 22.

Figure 10:
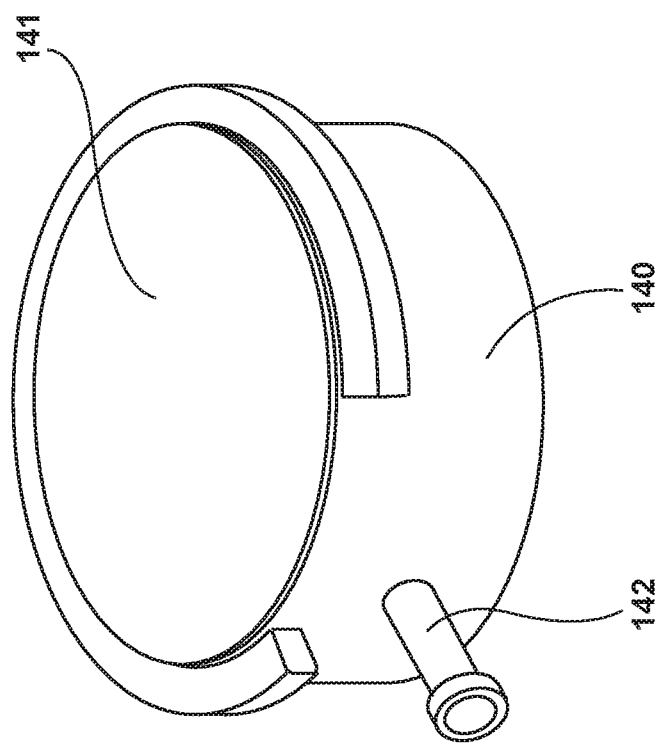
FIG. 10 is a perspective view of a holder and a thermoelectric device of an aspect of the present disclosure.
Figure 11:
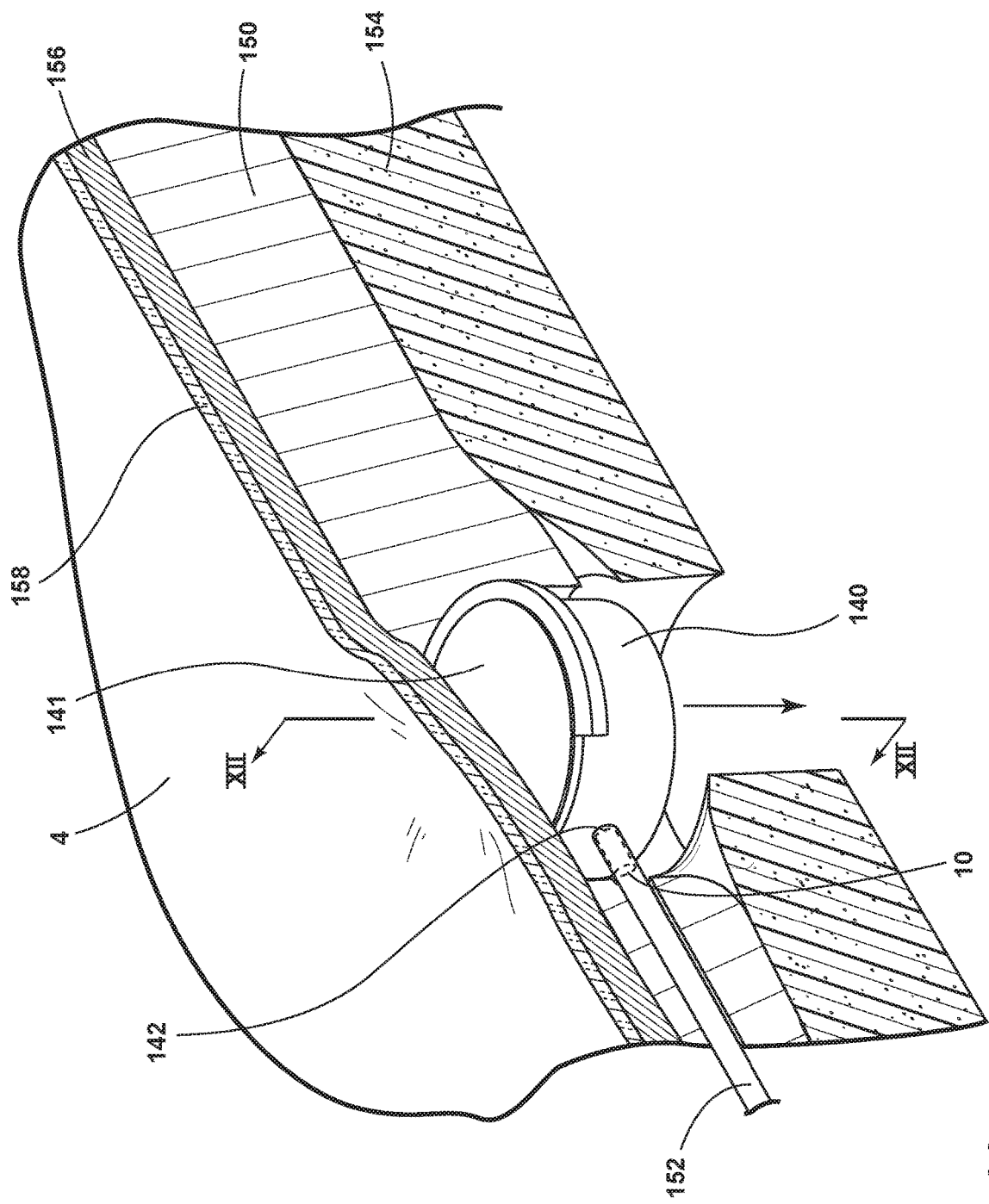
FIG. 11 is a cutaway perspective view of a conduit and a holder in a cushion.
Figure 12:
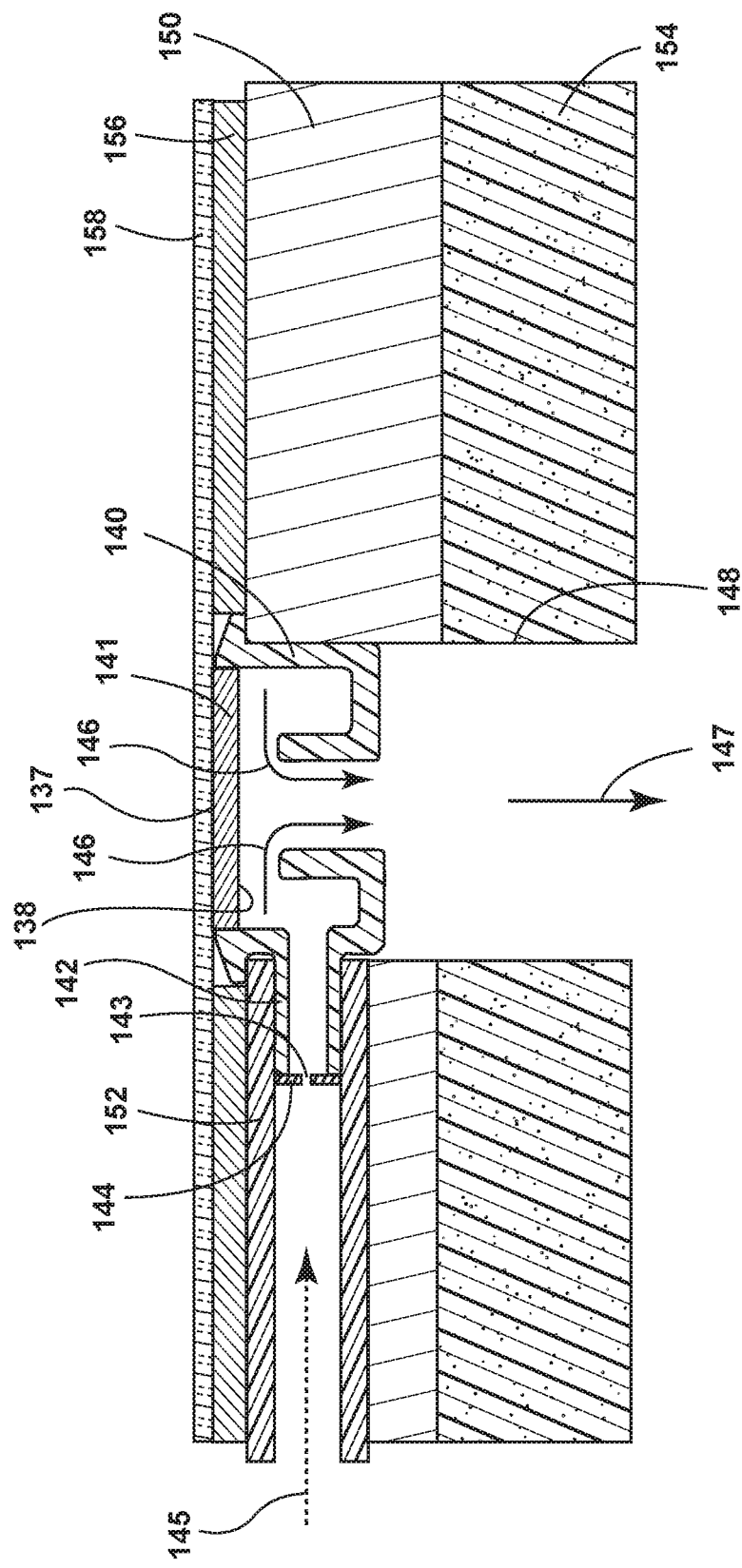
FIG. 12 is a cross-sectional view of a conduit and a holder taken along line XII-XII of FIG. 11.

Referring to FIG. 10, a holder 140 is shown with a thermoelectric device 141 and an inlet port 142. Referring to FIGS. 10-12, holders 140 retain thermoelectric devices 141. The thermoelectric devices 141 are arranged proximate the seating surface 4 to cool or heat an occupant. The thermoelectric devices 141 have upper surfaces 137 and lower surfaces 138. A fluid mover 12 is selectively operable to expel a pressurized cooling fluid from conduit 152 into the holders 140 to increase the efficiency of the thermoelectric device 141. In various aspects, the fluid mover 12 is a compressor. In various aspects, the carrier layer 150 with holder 140, thermoelectric device 141, and conduit 152 may be a modular component that is inserted in the seat 20 and/or seatback 22 as a module during the assembly process. The carrier layer 150 is supported by the base support foam 154. A topper pad 156 covers the carrier layer 150 and the conduit 152. A seat pad 158 covers the topper pad 156. In various aspects, a trim cover 34 covers the seat pad 158. In various aspects, the topper pad 156 and/or the seat pad 158 should be thermally conductive.

With reference to FIG. 12, the conduit 152 is around the holder 140 inlet port 142. An airflow restriction 144 is at the holder 140 inlet port 142. Airflow at arrow 145 enters the conduit 152. Airflow at arrow 145 passes through the pressure release point 143 at the airflow restriction 144 and moves into the holder 140. In various aspects, the airflow restriction 144 may be a metered hole. The airflow at arrows 146 circulates within the holder 140 and impinges the lower surface 138 of the thermoelectric device 141. The airflow at arrows 146 travels from the holder 140 to the exit channel 148. The base support foam 154 supports the carrier layer 150. The carrier layer 150 contains the conduit 152 and the holder 140. The holder 140 retains the thermoelectric device 141. The thermoelectric device 141 is connected to the seating assembly power source, the vehicle wire harness and/or another power source. In various aspects, a holder 140 is puck-shaped. In various aspects, a holder 140 is an insulator. In various aspects, a holder 140 is nylon or polypropylene. In various aspects, a holder 140 is rigid.

Figure 13:
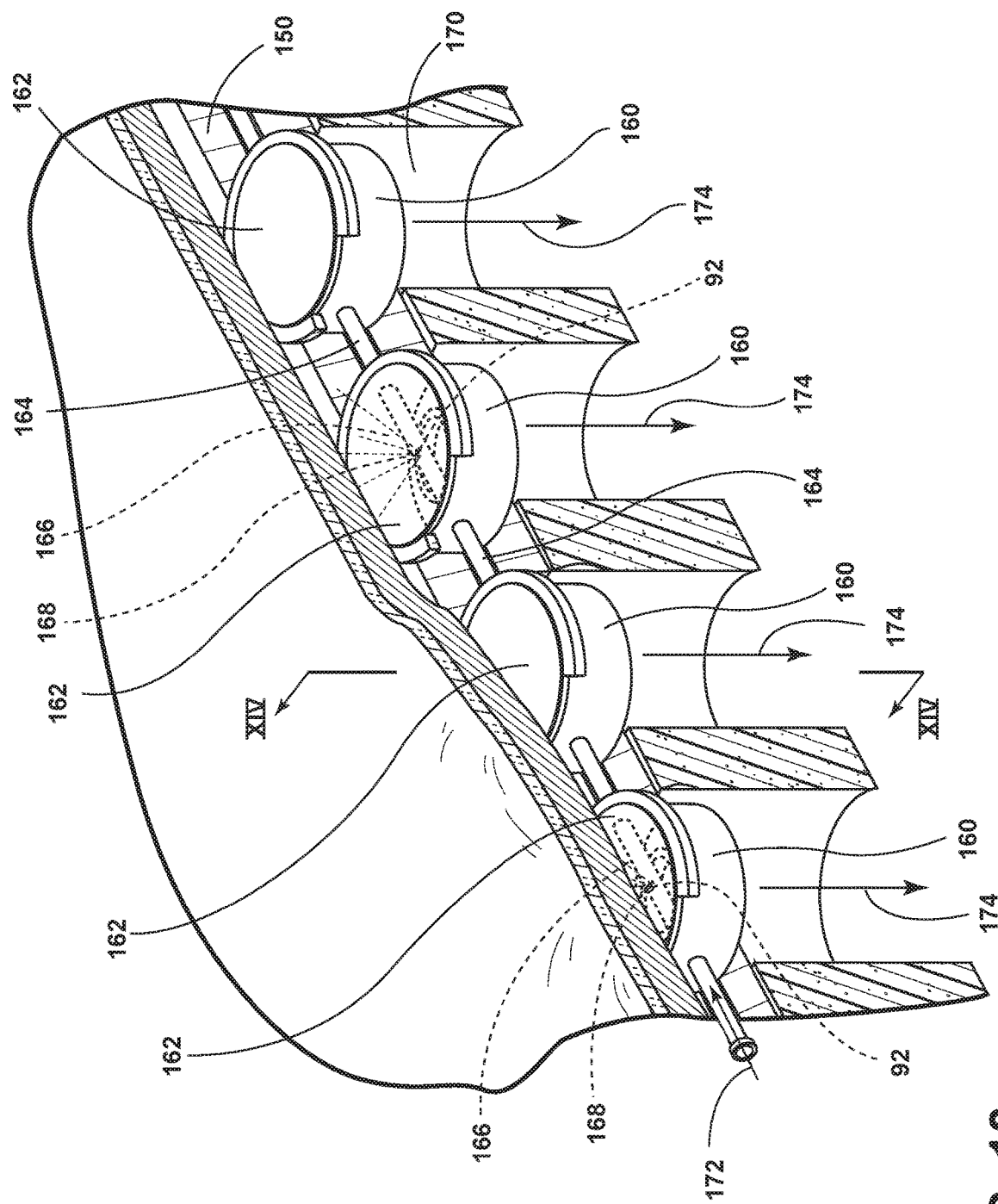
FIG. 13 is a cutaway perspective view of retainers in series along a hose of an aspect of the present disclosure.
Figure 14:
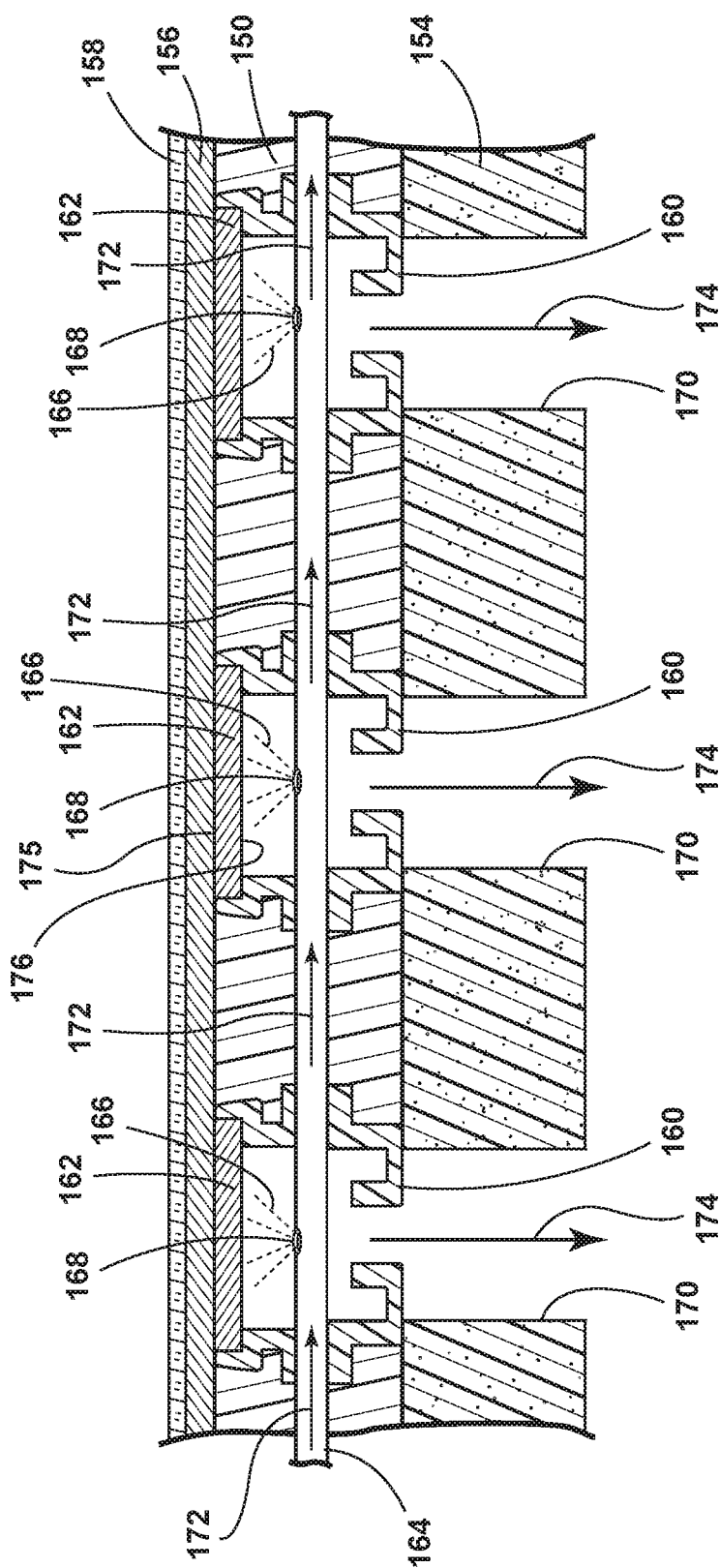
FIG. 14 is a cross-sectional view of retainers in series along a hose taken along line XIV-XIV of FIG. 13.

Referring to FIGS. 13-14, retainers 160 with thermoelectric devices 162 and hose 164 are nested in the carrier layer 150. In the depicted aspect, the retainers 160 surround the hose 164 in a sleeve-like configuration. The thermoelectric devices 162 have an upper surface 175 and a lower surface 176. Airflow at arrows 172 travels through the hose 164. Pressurized airjets 166 leave the hose 164 at outlets 168. In various aspects, the outlets 168 may be metered holes. Airjets 166 impinge the lower surfaces 176 of the thermoelectric devices 162 to carry air away from the lower surfaces 176 of the thermoelectric devices 162 and out of the exhaust channels 170 at airflow arrows 174. Thermoelectric devices 162 are pictured in retainers 160. In various aspects, a retainer 160 is puck-shaped. In various aspects, a retainer 160 is an insulator. In various aspects, a retainer 160 is nylon or polypropylene. In various aspects, a retainer 160 is rigid.

In various aspects of the disclosure, a valve or a porous plug may be utilized at a tube outlet aperture to maintain the fluid pressure within the tube until the pressurized fluid leaves the tube.

In various aspects of the disclosure, the tubes and thermoelectric devices may extend to the headrest or other seating assembly areas such as armrests, bolsters, and other seating assembly areas. In various aspects of the disclosure, temperature control zones may be present in the headrest or other seating assembly areas such as armrests, bolsters, and other seating assembly areas.

In various aspects of the disclosure, the air mover and one or more thermoelectric devices are selectively operable to heat or cool the seat and the seatback in various combinations (e.g., heat/cool only seat, heat/cool only seatback, heat seat and cool seatback, heat seatback and cool seat, etc.).

In various aspects of the disclosure, a flat faced plug with a metered hole through it is at the tube outlet aperture. A hole may be created in the tube during a molding process. Alternatively, the hole may be created by (1) thermoclosing the end of the tube or using a self-welding thermoplastic; (2) waiting for the tube to cure; or (3) puncturing the tube with a laser.

In various aspects of the disclosure, the fluid mover may be a small air pump located beneath the seating assembly and coupled to the tube. In various aspects, an occupant's temperature is input that directs the selective operation of the air mover and/or thermoelectric devices to cool or heat the occupant. In various aspects, the metered vent measures the output temperature, pressure, flow rate, or other variable.

In various aspects of the disclosure, the trim cover may be a cloth that breathes or a perforated vinyl or leather. In various aspects, the trim cover may be non-permeable and may reduce accrued sweat odors in the seat.

In various aspects of the disclosure, a tube may have more than one inlet to deliver pressurized fluid into the tube.

In various aspects of the disclosure, the seating assembly may be used in cars, trucks, buses, trains, aircraft, boats, autonomous vehicles, and other vehicles.

In various aspects of the disclosure, the seating assembly may be used in homes and the medical industry.

In various aspects of the disclosure, the tubes and thermoelectric devices are within flexible layers of the seat and/or seatback so that when an occupant exerts force on the seat or seatback, the tubes and thermoelectric devices remain substantially functional. In various aspects, the tubes may be very flexible so that they are able to deliver pressurized air when a variety of loads (knee loads, etc.) are exerted on them. In various aspects of the disclosure, the diameters of the tubes are so small that the tubes are more flexible.

In various aspects of the disclosure, a feedback loop may collect information from the upper surface of the thermoelectric device, the lower surface of the thermoelectric device, and/or the occupant and may control the polarity of the thermoelectric device (i.e., cooling or heating function) and the voltage (extent of cooling or heating) of the thermoelectric device.

A variety of advantages may be derived from use of the present disclosure. Thermoelectric device efficiency increases due to delivery of pressurized cooling air to thermoelectric device lower surfaces. Convective cooling and heating of a passenger are possible due to thermoelectric devices at the seating surface. Conductive cooling or heating of an occupant allows the use of non-perforated washable trim cover. A seating assembly may be designed to have temperature control zones at selected locations. For example, more economical applications may require fewer cooling zones while more expensive applications require more cooling zones. Cooling zone placement may also be based on an occupant's size, anticipated vehicle use, vehicle climate, and other factors. The size and location of the tubes and thermoelectric devices may be selected based on vehicle needs.

The pressurized cool air delivery in a seating assembly is also disclosed in co-pending, commonly assigned to Ford Global Technologies, LLC, U.S. application Ser. No. 15/689,314—Vehicle Seat with Cooling Fluidflow and US application Ser. No. 15/689,325, now issued as U.S. Pat. No. 10,252,652,—Seating Assembly with Heating and Cooling, the entire disclosures of which are hereby incorporated herein by reference.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
   a seating surface;
   a tube arranged proximate the seating surface, the tube having an inlet fluidly coupled with an air displacement device and an outlet proximate the seating surface; and
   a thermoelectric device in fluid communication with the outlet and configured to thermodynamically affect heat exchange at the seating surface;
   wherein the air displacement device is selectively operable to release a pressurized fluid through the tube proximate the thermoelectric device and wherein the pressurized fluid undergoes a temperature reduction at the outlet due to an adiabatic process.

2. The vehicle seating assembly of claim 1, wherein the thermoelectric device comprises an upper surface and lower surface and wherein the pressurized fluid travels along the lower surface of the thermoelectric device and away from the seating surface.

3. The vehicle seating assembly of claim 2, wherein the pressurized fluid carries heat away from the lower surface of the thermoelectric device and out of an exhaust channel oriented away from the seating surface.

4. The vehicle seating assembly of claim 3, wherein the thermoelectric device is selectively operable to cool or heat the seating surface and wherein airflow discharged from the outlet absorbs heat from a lower surface of the thermoelectric device and leaves the exhaust channel.

5. The vehicle seating assembly of claim 1, further comprising a thermally conductive pad wherein the thermally conductive pad is between the thermoelectric device and the seating surface.

6. The vehicle seating assembly of claim 1, wherein the tube is one of a plurality of tubes and wherein the thermoelectric device is one of a plurality of thermoelectric devices.

7. The vehicle seating assembly of claim 1, further comprising:
   a holder proximate the seating surface;
   wherein the holder retains the thermoelectric device;
   wherein the outlet of the tube is fluidly coupled to the holder below the thermoelectric device; and
   wherein the pressurized fluid travels from the outlet into the holder, along the thermoelectric device, out of the holder, through an exhaust channel, and away from the seating surface.

8. The vehicle seating assembly of claim 7 wherein the holder is puck shaped.

9. The vehicle seating assembly of claim 7, wherein the holder is a thermal insulator.

10. The vehicle seating assembly of claim 7, wherein a carrier layer retains the tube, the holder, and the thermoelectric device.

11. The vehicle seating assembly of claim 1, wherein the seating surface extends over a seat and wherein the inlet is at a downward facing portion of the seat and the outlet is at an upward facing portion of the seat.

12. The vehicle seating assembly of claim 1, wherein the seating surface extends over a seatback and wherein the inlet is at a rearward facing portion of the seatback and the outlet is at a forward facing portion of the seatback.

13. A vehicle seating assembly, comprising:
   a seating surface;
   a tube arranged proximate the seating surface, the tube having an inlet fluidly coupled with an air displacement device and an outlet proximate the seating surface; and
   a thermoelectric device in communication with the outlet and configured to thermodynamically affect heat exchange at the seating surface;
   wherein the air displacement device is selectively operable to release a pressurized fluid through the tube proximate the thermoelectric device and wherein a temperature reduction occurs at the outlet due to a Joule-Thomson effect.

14. The vehicle seating assembly of claim 13, wherein the air displacement device includes a compressor.

15. A vehicle seating assembly, comprising:
   a seating surface;
   a tube arranged along the seating surface and including:
      a first end; and
      a second end;
   an air displacement device fluidly coupled to the first end of the tube; and a holder surrounding a thermoelectric device disposed proximate the seating surface and including:
an inlet port surrounding the tube proximate the second end of the tube;
wherein the air displacement device is selectively operable to release a pressurized fluid into the holder and wherein the pressurized fluid undergoes a temperature reduction due to an adiabatic process or a Joule-Thomson effect when the pressurized fluid is released into the holder.

16. The vehicle seating assembly of claim 15, wherein the second end of the tube includes an outlet disposed in the holder and wherein the outlet includes a metered vent.

17. The vehicle seating assembly of claim 15, wherein the second end of the tube includes an outlet disposed in the holder and wherein the outlet includes a valve.

18. The vehicle seating assembly of claim 15, wherein the second end of the tube includes an outlet disposed in the holder and wherein the outlet includes a porous plug.

19. The vehicle seating assembly of claim 15, further comprising:
an airflow restriction disposed at the inlet port of the holder and surrounded by the second end of the tube.

20. The vehicle seating assembly of claim 19, wherein the airflow restriction includes a metered hole.

* * * * *